US012638807B2

(12) United States Patent
Pinsker et al.

(10) Patent No.: US 12,638,807 B2
(45) Date of Patent: May 26, 2026

(54) METHOD FOR PRODUCING A CURVED SUBSTRATE PANEL WITH A HOLOGRAM, RESULTING SUBSTRATE PANEL WITH HOLOGRAM AND A LAMINATE CONTAINING SUCH A SUBSTRATE PANEL, IN PARTICULAR A VEHICLE WINDOW

(71) Applicant: Bayerische Motoren Werke Aktiengesellschaft, Munich (DE)

(72) Inventors: Martin Pinsker, Bruckberg (DE); Tobias Solchenbach, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 829 days.

(21) Appl. No.: 17/775,776

(22) PCT Filed: Oct. 13, 2020

(86) PCT No.: PCT/EP2020/078676
§ 371 (c)(1),
(2) Date: May 10, 2022

(87) PCT Pub. No.: WO2021/094046
PCT Pub. Date: May 20, 2021

(65) Prior Publication Data
US 2022/0382211 A1    Dec. 1, 2022

(30) Foreign Application Priority Data

Nov. 11, 2019    (DE) ..................... 10 2019 130 284.6

(51) Int. Cl.
*B29C 37/00*        (2006.01)
*G03H 1/00*        (2006.01)
(Continued)

(52) U.S. Cl.
CPC ....... *G03H 1/0005* (2013.01); *B29C 37/0028* (2013.01); *G03H 1/0248* (2013.01);
(Continued)

(58) Field of Classification Search
CPC ........ B29C 37/0028; B29C 2045/0079; B29C 45/16; B29C 45/1679; B29C 45/0062; G03H 1/0005
See application file for complete search history.

(56) References Cited

U.S. PATENT DOCUMENTS 4,856,857 A * 8/1989 Takeuchi ............... B42D 25/46
                                                        359/3
4,998,784 A * 3/1991 Freeman ............ G02B 27/0103
                                                        359/15

(Continued)

FOREIGN PATENT DOCUMENTS

DE      10 2004 030 019 A1    1/2006
JP            11-10674 A       1/1999
WO      WO 2016/113288 A1    7/2016

OTHER PUBLICATIONS

International Search Report (PCT/ISA/210) issued in PCT Application No. PCT/EP2020/078676 dated Jan. 14, 2021 with English translation (four (4) pages).

(Continued)

*Primary Examiner* — Andrew D Graham
(74) *Attorney, Agent, or Firm* — Crowell & Moring LLP

(57)        ABSTRACT

A method for producing a curved substrate panel with a hologram includes producing a curved substrate panel from plastic by forming, injection moulding or injection-compression molding between a first mold half, which defines a predetermined desired geometry of a substrate surface, and a second mold half removing the first mold half from the second mold half and applying a holographic master to a surface of the first mold half, or of a further mold half fixing (Continued)

the first mold half or further mold half on the second mold half such that an empty gap of a predetermined constant thickness remains between the holographic master and the substrate surface, and filling this gap with a hologram-receiving material; and exposing the hologram-receiving layer formed between the substrate surface and the holographic master with a coherent light for forming a hologram defined by the holographic master.

7 Claims, 2 Drawing Sheets

(51) Int. Cl.
  *G03H 1/02* (2006.01)
  *B29C 45/56* (2006.01)
  *B29L 31/00* (2006.01)
  *B29L 31/30* (2006.01)
(52) U.S. Cl.
  CPC . *B29C 2045/565* (2013.01); *B29L 2031/3052* (2013.01); *B29L 2031/7224* (2013.01); *B29L 2031/7782* (2013.01); *G03H 2001/0088* (2013.01); *G03H 2270/11* (2013.01); *G03H 2270/21* (2013.01); *G03H 2270/32* (2013.01)

(56) References Cited

U.S. PATENT DOCUMENTS

| | | | | |
|---|---|---|---|---|
| 5,189,531 A * | 2/1993 | Palmer | ................... | A45D 33/18 |
| | | | | 215/230 |
| 5,631,107 A * | 5/1997 | Tarumi | ................. | G03H 1/0252 |
| | | | | 430/257 |
| 5,759,594 A * | 6/1998 | Masui | ..................... | B29C 51/32 |
| | | | | 425/510 |
| 5,790,209 A * | 8/1998 | Engelhardt | ........... | B64C 1/1476 |
| | | | | 349/16 |
| 5,812,332 A * | 9/1998 | Freeman | ........... | B32B 17/10761 |
| | | | | 428/56 |
| 9,321,226 B2 | 4/2016 | Poffet et al. | | |
| 2004/0032667 A1 * | 2/2004 | Gale | ................... | B29C 33/3842 |
| | | | | 430/323 |
| 2005/0227080 A1 * | 10/2005 | Horsting | ............... | B29C 43/183 |
| | | | | 264/510 |
| 2006/0118999 A1 * | 6/2006 | Cooper | ................. | B29C 45/561 |
| | | | | 264/255 |
| 2007/0013983 A1 * | 1/2007 | Kitamura | ............. | G03H 1/2202 |
| | | | | 359/3 |
| 2007/0070477 A1 * | 3/2007 | Eto | .......................... | G03H 1/16 |
| | | | | 359/12 |
| 2007/0194487 A1 * | 8/2007 | Neitzke | ................... | B32B 15/08 |
| | | | | 264/494 |
| 2009/0085235 A1 * | 4/2009 | Burkle | ................ | B81C 1/00206 |
| | | | | 264/1.24 |
| 2009/0174121 A1 * | 7/2009 | Hayes | ................. | B29C 45/1671 |
| | | | | 264/261 |
| 2010/0075140 A1 * | 3/2010 | Hayes | ..................... | B32B 27/36 |
| | | | | 428/332 |
| 2010/0080970 A1 * | 4/2010 | Hayes | ................. | B29C 45/1671 |
| | | | | 428/209 |
| 2010/0086740 A1 * | 4/2010 | Lee | ........................ | B29C 45/372 |
| | | | | 428/156 |
| 2010/0112458 A1 | 5/2010 | Knocke | | |
| 2010/0134888 A1 * | 6/2010 | Korenaga | ........... | G02B 5/1814 |
| | | | | 359/576 |
| 2010/0140851 A1 * | 6/2010 | Jin | ...................... | B29C 45/7613 |
| | | | | 264/447 |
| 2011/0174218 A1 * | 7/2011 | Jin | ...................... | B29C 35/0888 |
| | | | | 118/620 |
| 2014/0242273 A1 * | 8/2014 | Poffet | .................... | G04B 15/14 |
| | | | | 427/164 |
| 2016/0052227 A1 * | 2/2016 | Takihara | ................. | B32B 27/06 |
| | | | | 428/141 |
| 2017/0259478 A1 * | 9/2017 | Bedard | ............... | B29C 45/1679 |
| 2017/0368723 A1 * | 12/2017 | Fäecke | ............ | B29D 11/00528 |
| 2018/0029264 A1 * | 2/2018 | Sharron | .............. | B29C 45/1671 |
| 2018/0195680 A1 * | 7/2018 | Muegge | ............... | G03H 1/0236 |
| 2018/0304499 A1 * | 10/2018 | Constantinou | ......... | B29C 33/22 |
| 2018/0370096 A1 * | 12/2018 | Fuchs | ..................... | B29C 45/73 |
| 2020/0180199 A1 * | 6/2020 | Kim | ................. | B29C 45/14336 |
| 2020/0269480 A1 * | 8/2020 | Burger | ............... | B29C 45/0053 |

OTHER PUBLICATIONS

German-language Written Opinion (PCT/ISA/237) issued in PCT Application No. PCT/EP2020/078676 dated Jan. 14, 2021 (five (5) pages).

German-language Search Report issued in German Application No. 10 2019 130 284.6 dated Jul. 6, 2020 with partial English translation (11 pages).

* cited by examiner

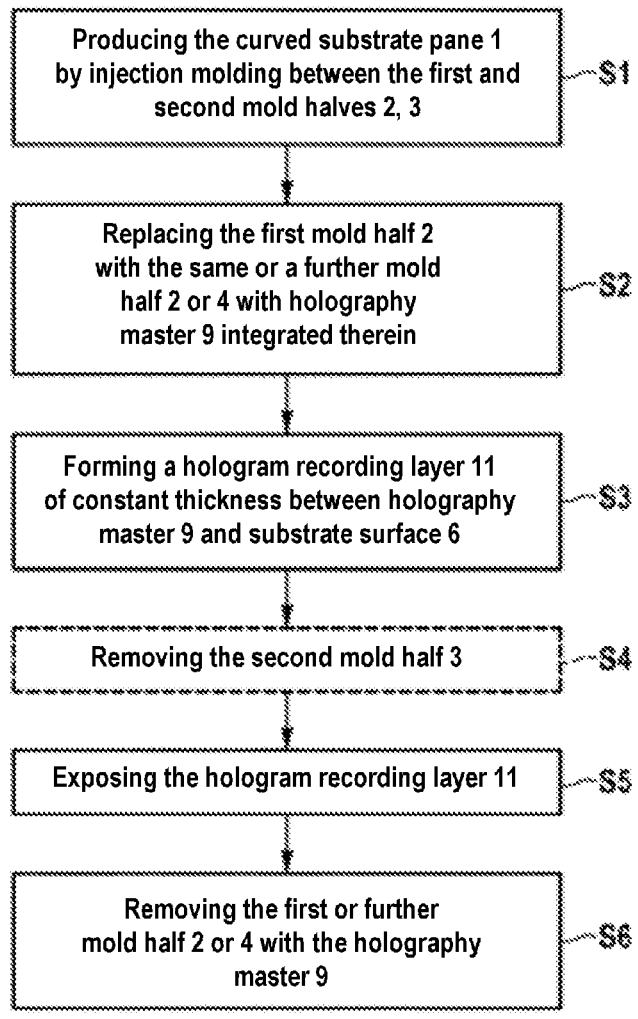

Producing the curved substrate pane 1
by injection molding between the first and
second mold halves 2, 3                    ～S1

Replacing the first mold half 2
with the same or a further mold
half 2 or 4 with holography
master 9 integrated therein                ～S2

Forming a hologram recording layer 11
of constant thickness between holography
master 9 and substrate surface 6           ～S3

Removing the second mold half 3            ～S4

Exposing the hologram recording layer 11   ～S5

Removing the first or further
mold half 2 or 4 with the holography
master 9                                   ～S6

Fig. 1

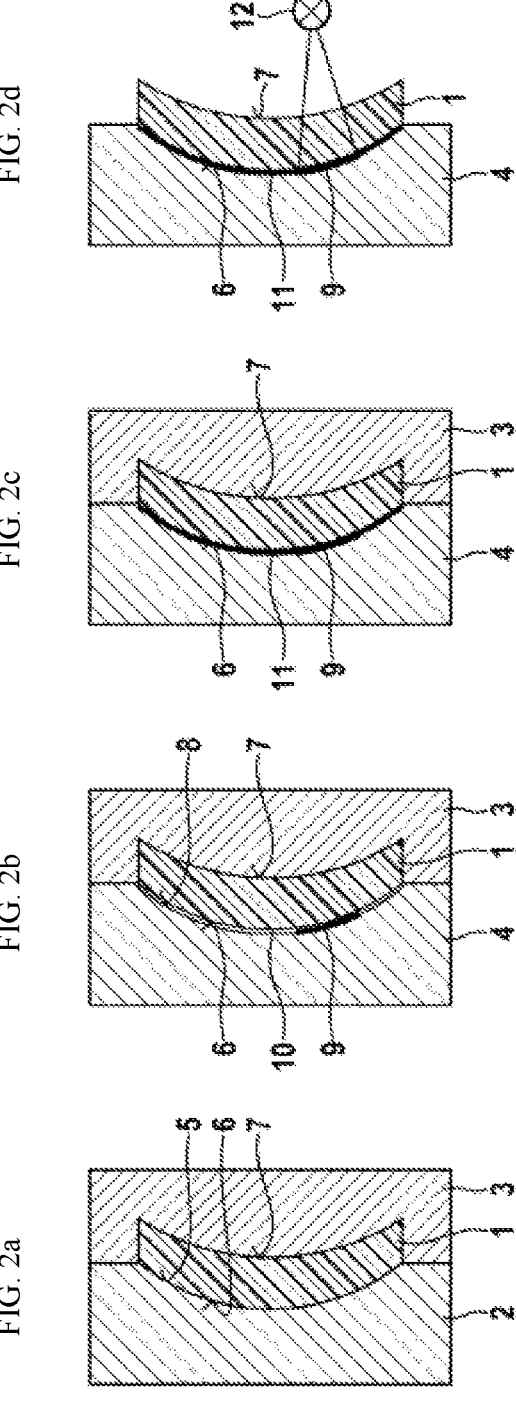

METHOD FOR PRODUCING A CURVED SUBSTRATE PANEL WITH A HOLOGRAM, RESULTING SUBSTRATE PANEL WITH HOLOGRAM AND A LAMINATE CONTAINING SUCH A SUBSTRATE PANEL, IN PARTICULAR A VEHICLE WINDOW

BACKGROUND AND SUMMARY OF THE INVENTION

The invention relates, in general terms, to methods of producing a hologram, and is especially directed to the integration of a hologram between two curved panes in a pane composite, for example in a vehicle windowpane, and to a vehicle equipped therewith. The vehicle may be any land vehicle, aircraft or watercraft, especially a motor vehicle. The hologram may especially be a holographic optical element (HOE) which is to be integrated, for example, as an element of a head-up display in a vehicle windshield.

Head-up displays (HUDs) in a vehicle show display contents, for example a message about a speed limit or other navigation and vehicle operation instructions, in the form of a virtual display image superimposed on the real image of the environment in front of the vehicle which is observed by the driver. For this purpose, a head-up display generally comprises a projection unit incorporated into the dashboard that generates a projected light beam with the desired display contents and projects it onto the vehicle windshield, whence it is reflected back to the driver.

In order to largely save the driver from any adjustment of vision when changing the view between the road in front and the display to be read, the virtual display image is typically created at a certain distance from the driver. In order to achieve this and other imaging properties, projection units in head-up displays for the automotive sector are conventionally constructed by way of concave mirrors, but the size of these is proportional in a linear manner with the size of image of the virtual display image and a field of view (FoV) that can be covered thereby. In order to distinctly extend the field of view that can be covered, for example for a contact-analogous AR (augmented reality) display oriented to real objects in the environment, it would be necessary in the conventional HUD display mode to integrate a correspondingly large concave mirror in the dashboard, which leads to problems in respect of the available construction space in the vehicle interior or else in respect of the appearance thereof, since a correspondingly large opening would again be required for the exiting projection light beam in the dashboard.

To overcome such problems, there are known approaches for head-up display devices in motor vehicles that comprise integration into a vehicle windshield of a holographic optical element (HOE) which, for example, assumes the optical function of a concave mirror customary for the conventional projection unit. This enables a more compact HUD design without concave mirrors, which is also known as a holographic head-up display. For this purpose, it is known, for example, from U.S. Pat. No. 4,998,784 A, that a hologram can first be produced as a flat film with requisite optical properties on a separate flexible substrate and then incorporated by lamination between two glass panes of a composite safety glass construction typical of vehicle windowpanes by way of a PVB (polyvinylbutyral) hotmelt adhesive that bonds the two. The flexible substrate on which the hologram has originally been created is pulled away from the hologram or chemically dissolved before the ultimate lamination procedure, and hence is not included in the resulting vehicle windowpane.

In the lamination of such finished HOE films in a pane composite, however, they are subjected to high pressures and temperatures that can have an adverse effect on the material properties and stability of the hologram. In addition, the laminating of a hologram produced as a flat film or flat foil, usually in a roll-to-roll process, into a 3D-curved geometry of a vehicle windowpane is generally impossible without wrinkling or creasing of the HOE film. This can lead to considerable impairment of the optical function of the hologram.

All attempts to laminate a material capable of recording a hologram, for instance in the form of a holographic film, into a composite glass prior to exposure and only then to expose a hologram or an HOE therein require significant interventions into the composite glass production process, and are barely implementable industrially on account of the demands of the exposure process, such as thermal stability, freedom from vibration, dark environment, etc.

On the other hand, especially for banknotes or ID documents, a hologram production method by production of what are called "contact copies" is known to be particularly viable for mass production. This involves applying a hologram recording layer of a photopolymer in liquid form to a substrate, for example a film or foil, and exposing it in reflection in direct contact with a master hologram (also called holography master) and hence copying it, i.e. replicating it. In other words, a holography master which is generally a surface hologram is used here for the repeated production of a hologram, which generally takes the form of a volume hologram in the photopolymer layer. Only in the exposure and subsequent fixing with UV light does the liquid photopolymer cure.

The layer thickness of the liquid photopolymer in this method has to be set with an accuracy of less than 10 micrometers. In this connection, geometric tolerances between the substrate and the holography master play a major role, since, firstly, the master has to be in contact with the photopolymer over the full area for the duration of the hologram recording and, secondly, the separation of master and substrate determines the said layer thickness of the photopolymer layer. In the case of a flat geometry, it is possible to precisely adjust the constant separations between a flat substrate and a flat holography master that are required for the hologram recording without difficulty, for instance in a roll-to-roll process. In known methods, the substrate generally takes the form of a flat film or a flat foil, i.e. a non-curved form, while the holography master is generally a rigid metallic component which is inflexible and hence cannot compensate for any substrate tolerances. Furthermore, the processing times for such a hologram replication are barely compatible with an industrial glassmaking process, for instance with the above composite safety glass construction.

Integration of a holographic optical element into or onto a vehicle windowpane in the form of toughened safety glass has not been possible to date, since a liquid photopolymer cannot be applied to a three-dimensionally curved toughened safety glass pane, or a holography master cannot be held against such a pane with the required contact area etc., and a separately produced HOE film cannot simply be bonded to a toughened safety glass pane, one reason being the lack of requisite service life of the hologram with respect to aging in this manner.

It is an object of the invention to solve the above problems by providing an alternative or improved method of producing a hologram, which enables the integration thereof in a pane composite having three-dimensionally curved panes, especially in a vehicle windowpane. It is also an object of the invention to provide a corresponding pane composite and a vehicle equipped therewith.

These objects are achieved by a method of producing a curved substrate pane with a hologram and a resulting curved substrate pane with a hologram, a pane composite comprising the latter, especially a vehicle windowpane, and a vehicle equipped therewith. All further features and effects specified for the method are also applicable in relation to the substrate pane with hologram produced by this method, the pane composite and the vehicle, and vice versa.

In a first aspect, a method of producing a curved substrate pane with a hologram is provided. The curved substrate pane may especially serve as a fixed constituent of a future component, for example a vehicle windowpane, which is to be equipped with a hologram, and therefore has a three-dimensionally curved geometric shape of this component that differs from a flat or planar geometry. The curved substrate pane may in principle be manufactured from any material suitable for the production method described herein, especially from plastic, for example from polycarbonate.

The hologram is especially a holographic optical element (HOE) which is to be integrated in a windshield of the vehicle, for example as an element of a head-up display (HUD) of the type described at the outset, in order to assume the function of a concave mirror. Alternatively, other optical functions of the HOE created on the curved substrate pane are also achievable by the present hologram production method, for example an angle-selective diffuser hologram for representation of display contents directly on the resulting (vehicle) pane, which can thus serve as a kind of screen, or an outcoupling hologram for a waveguide HUD, in which a flat waveguide is formed in the windshield for display of contents. The vehicle may be any land vehicle, aircraft or watercraft, especially a motor vehicle.

This method comprises the following steps which, unless stated otherwise, may especially be conducted successively in the sequence specified:

producing a curved substrate pane by primary forming, injection molding or injection compression molding between a first mold half that defines a predetermined curved target geometry of a substrate surface to be equipped with a hologram and an opposite second mold half separably fixed to the first mold half which defines a reverse side;

removing the first mold half from the second mold half in which the substrate pane produced remains;

applying a holography master in the form of a thin layer, especially of essentially constant thin layer thickness, to a surface defining the target geometry in the removed first mold half. The holography master that takes the form of a flexible thin layer, for example, follows the predetermined target geometry of this surface of the first mold half. Alternatively, a further mold half that replaces the first mold half may be provided here, with the possibility of permanent integration of a holography master into the surface thereof that defines the predetermined target geometry;

fixing the first or further mold half having the holography master integrated in this manner on the second mold half in such a way as to leave an empty gap of a predetermined essentially constant thickness between the holography master and the substrate surface, and filling this gap with a hologram recording material, especially a liquid photopolymer so as to form a hologram recording layer of a corresponding essentially constant layer thickness having full area contact with the holography master; and exposing the hologram recording layer thus formed on the substrate surface with a coherent light in an additionally fixed hologram recording arrangement that continues to exist for the duration of the exposure, especially for assurance of a requisite freedom from vibration, in which the hologram recording layer has full-area contact with the holography master and a constant layer thickness corresponding to the predetermined thickness of the gap, so as to form a hologram defined by the holography master in the hologram recording layer.

The exposure may be implemented, for example, on the reverse side through the substrate pane, i.e. in reflection. More particularly, the holography master here may take the form of a surface hologram. The hologram may especially take the form of a volume hologram in the hologram recording layer in that, as described, it is exposed and hence copied in reflection, i.e. replicated, in direct contact with the holography master. As well as its function as a hologram negative, the holography master held against the hologram recording layer by way of the first or further mold half can also contribute to the assurance of the required freedom from vibration for the duration of the exposure, which, according to the application, may also be up to a few minutes.

According to the hologram recording material used, the hologram recording layer can subsequently be fixed, for example, with suitable coherent light, for instance with UV light. Only on exposure and subsequent fixing with UV light is there curing, for example, of the liquid photopolymer. After the described completion of the hologram in the hologram recording layer, the holography master is removed therefrom again by removing the first or further mold half bearing the holography master from the substrate pane. The finished product, after the removal of both mold halves, comprises the curved substrate pane with the hologram recording layer formed on the substrate surface and bonded thereto, in which the hologram is formed.

The present invention is based on the finding that, in primary forming, injection molding or injection compression molding methods, the geometry of the component, for example of a curved substrate pane, is determined exactly by the mold geometry as long as the component produced remains in the mold. By contrast, tolerances generally arise only after the withdrawal of the component from the mold. Similarly to an individual glass pane intended for conventional vehicle glazing, for example for the windshield, a finished plastic pane of the same size and geometry would typically be subject to geometry tolerances of a few tenths of a millimeter. However, the layer thickness of the hologram recording layer, especially of the liquid photopolymer, in the present hologram recording method should be established with an accuracy of less than 10 micrometers, i.e. 10 to 100 times more accurately than the typical geometry tolerance of a finished substrate pane. However, such a variance in geometry tolerance between the substrate pane and the holography master would be unacceptable since, firstly, the holography master must be in full contact with the hologram recording layer for the duration of the hologram recording and, secondly, the separation of holography master and substrate pane determines the layer thickness mentioned for the hologram recording layer.

One concept of the present method is to integrate the holography master into a mold in which the curved substrate pane is produced, and to conduct the hologram replication directly after the primary forming, injection molding or compression injection molding operation, i.e. while the curved substrate pane is still at least partly in the mold. In this way, it is possible to satisfy both abovementioned tolerance requirements between the holography master and the substrate surface and compatibility of the process times required for industrial applications for the pane and hologram production.

Furthermore, this enables hologram production directly on a three-dimensionally curved substrate pane that forms part of a future component, such as a vehicle windowpane, such that the hologram is produced immediately in the ultimate geometry of the component and does not have to be subsequently laminated thereon and shaped, as in conventional methods mentioned at the outset. Moreover, the hologram in the present method is also produced immediately on the ultimate substrate that does not have to be removed later, and is thus additionally protected against any damage in the course of later handling in component production.

In a first embodiment, the exposure of the hologram recording material is conducted in a closed state of the mold, in which the curved substrate pane with the hologram recording layer formed thereon is fixed between the two mold halves fixed to one another, i.e. between the first or further mold half in which the holography master is integrated, and the second mold half in which the substrate pane has been produced and from which it is yet to be withdrawn. In this way, the substrate pane, in the exposure operation, can especially be fixed by the mold on all sides, and therefore any geometric variances from the mold geometry are insignificant for the purposes mentioned above.

It is possible here for suitable exposure elements, especially optical fibers such as glass fibers etc. and/or suitable exposure optics of a type known per se to be integrated in the second mold half and/or in the first or further mold half, these being designed for exposure of the hologram recording layer with a coherent light for formation of a hologram defined by the holography master.

In an alternative second embodiment, the substrate pane, after the hologram recording material has been introduced into the gap formed between the substrate surface and the holography master, is held or fixed in this hologram recording position with regard to the first or further mold half, such that the second mold half can be removed from the reverse side of the substrate pane without altering the mutual arrangement firstly of the substrate pane with the hologram recording layer formed thereon and firstly of the holography master. The exposure of the hologram recording material is subsequently conducted in this hologram recording position through the substrate pane by way of a light source disposed at or behind the reverse side thereof.

In a further aspect of the invention, a curved substrate pane is provided, which has been produced according to a method of the type set out herein with a hologram created on the substrate surface. The hologram may especially be a holographic optical element. The curved substrate pane here may especially have been produced from plastic by primary forming, injection molding or injection compression molding between a first mold half that defines a predetermined target geometry of the substrate surface, and an opposite second mold half separably fixed to the first mold half. Thereafter, the first mold half has been removed from the substrate pane produced, present in the second mold half, and has been replaced by the same or a further mold half with a holography master integrated in the surface that defines the target geometry thereof. Thereafter, a hologram recording layer has been formed on the substrate pane remaining in the second mold half by the filling of a gap of a predetermined constant thickness between the holography master and the substrate surface with a hologram recording material, especially a liquid photopolymer. Thereafter, the hologram, especially in the form of a volume hologram, has been created in this hologram recording layer by the exposure thereof with a coherent light in a hologram recording position that continues to exist for the duration of the exposure, and has especially been fixed specially, having full-area contact with the holography master and a predetermined constant thickness of the hologram recording layer corresponding to the gap.

In a further aspect of the invention, a pane composite, especially a vehicle windowpane, is provided. The pane composite firstly comprises a curved substrate pane with a hologram of the type set out above created thereon as a first pane of the pane composite. The pane composite further comprises a second pane bonded to the first pane by an intervening bonding layer, especially of a hotmelt adhesive such as PVB (polyvinylbutyral), wherein the hologram is formed on a surface of the first pane facing the second pane. The second pane may, for example, be a glass pane, especially a conventional toughened glass pane. With a second pane made of glass, the result, rather than a conventional composite safety glass construction of the type specified at the outset, is a hybrid glass-plastic construction. Said bonding of the two panes of the composite may especially be implemented by a suitable lamination process of a type known per se.

By contrast with conventional composite glass having the "glass/PVB film/glass" layer construction, the resulting pane composite may, for example, have said hybrid glass-plastic construction having the "glass/PVB film/hologram layer/plastic substrate pane/surface finish" layers. It is optionally possible here to provide a surface finish, for example a hardcoat for better material resistance, for example to scratches, especially towards the interior of a vehicle. The plastic substrate pane here may consist of polycarbonate for example.

In a further aspect of the invention, a vehicle having a vehicle windowpane at least partly formed by a pane composite of the type described above is provided. The vehicle may be any land vehicle, aircraft or watercraft, especially a motor vehicle. In this case, the abovementioned first pane of the composite on which the hologram is created by the method of the type set out herein is especially an inner pane of the vehicle windowpane closer to or directly adjoining a vehicle interior, while the second pane is an outer pane of the vehicle windowpane lying closer to or directly adjoining the outside environment of the vehicle. The vehicle windowpane may, but need not, also have further layers or panes on the inside or outside of the pane composite in addition to the two panes mentioned.

This hologram may especially be a holographic optical element (HOE) integrated in a windshield of the vehicle, for example as an element of a head-up display of the type described at the outset, in order, for instance, to assume the function of a concave mirror. Alternatively, the HOE may be equipped with a different optical function, for example as an angle-selective diffuser hologram for display of display contents directly on the vehicle windowpane, which can thus be used as a kind of screen, or as an outcoupling hologram for a waveguide HUD in which a flat waveguide is formed in the vehicle windowpane for display of contents for passengers of the vehicle.

The above aspects of the invention and of the embodiments and specific configurations are elucidated in detail hereinafter with reference to the examples shown in the appended drawings. The drawings are purely schematic; more particularly, they should not be regarded as being true to scale.

BRIEF DESCRIPTION OF THE DRAWINGS

FIG. 1 shows a flow diagram of a method of the type set out herein for producing a curved substrate pane with a hologram.

FIGS. 2a-2d show schematic lateral cross-sectional views of a curved substrate pane produced by the method of FIG. 1 between two separately removable mold halves by primary forming, injection molding or compression injection molding, with hologram created thereon, by way of elucidation of individual process steps of a specific example.

DETAILED DESCRIPTION OF THE DRAWINGS

All the different embodiments, variants and specific configuration features, mentioned further up in the description and in the claims that follow, of the method according to the first aspect of the invention for producing a curved substrate pane having a hologram and of the resulting substrate pane, of the pane composite and of the vehicle according to the further aspects of the invention may be implemented in the examples shown in FIGS. 1 to 2d. They will therefore not all be repeated once again hereinafter. The same is correspondingly true of the definitions of terms and effects already specified further up in relation to individual features that are shown in FIGS. 1-2d.

FIG. 1 shows a flow diagram of the method according to the above first aspect of the invention for producing a curved substrate pane 1 with a hologram created thereon. One possible process sequence is elucidated hereinafter with reference to the specific example illustrated in FIGS. 2a-2d for the second embodiment of the method described further up. The curved substrate pane 1 with hologram which is produced in this example may especially serve as a constituent of a future vehicle windowpane, for example of a windshield of a vehicle (not shown). The hologram may especially be a holographic optical element (HOE) which is to be integrated in the vehicle windshield as an element of a head-up display.

FIGS. 2a to 2d show, each in highly simplified schematic vertical cross-sectional views, four mutual arrangements, successive in the performance of the process according to FIG. 1, of a curved substrate pane 1 and of a mold used for production of the substrate pane 1 and the hologram, comprising a first mold half 2, an opposite second mold half 3 which is separably fixable thereon, and optionally a further mold half 4 that replaces the first mold half 2 for hologram production.

In this example, the method according to FIG. 1 begins with a step S1 which is schematically illustrated in FIG. 2a and in which said three-dimensionally curved substrate pane 1 made of plastic is produced by primary forming, injection molding or injection compression molding between the first mold half 2, the surface 5 of which from the mold interior side defines a predetermined curved target geometry of a substrate surface 6 to be equipped with a hologram, and a second mold half 3 which is separably fixed on the first mold half 2 and defines a reverse side 7 of the substrate pane 1 (reverse substrate side) facing away from the substrate surface 6.

As illustrated in FIG. 2b, the first mold half 2, after completion of the curved substrate pane 1 in the mold, is removed in a further step S2 from the second mold half 3 in which the substrate pane 1 still remains, and in this example is replaced by a further mold half 4 with a holography master 9 integrated in/on the surface 8 on the mold interior side that defines this predetermined target geometry. The holography master 9 takes the form, for example, of a surface hologram, and follows the predetermined target geometry of the surface 8 on the mold interior side. In FIG. 2b, the holography master 9 covers only a subsection of the surface 8 on the mold interior side; alternatively, in the present process, it may also cover the entire surface 8 on the mold interior side in order to produce a hologram that extends over the entire substrate surface 6.

In this case, the further mold half 4 with the holography master 9 integrated therein is fixed on the second mold half 3 so as to leave an empty gap 10 of a predetermined constant thickness of, for example, about 0.1 mm between the holography master 9 and the substrate surface 6.

As illustrated in FIG. 2c, in a subsequent step S3, the gap 10 is filled with a hologram recording material, in this example a liquid photopolymer, for example by injection, so as to form a hologram recording layer 11 having a constant layer thickness corresponding to the gap thickness and having full-area contact with the holography master 9 on the substrate surface 6. In this example, the gap 10 and hence also the hologram recording layer 11, purely by way of example, extends over the entire substrate surface 6; alternatively, it may also extend merely over part of the substrate surface 6.

As illustrated in FIG. 2d, in a subsequent optional step S4, according to said second embodiment of the process, the second mold half 3 is removed from the reverse side 7 of the substrate pane 1, while the substrate pane 1 remains fixed in the hologram recording position established in FIG. 2c with regard to the further mold half 4 and the holography master 9 integrated therein. Subsequently, in a step S5, the exposure of the hologram recording layer 11 with coherent light is conducted in this hologram recording position through the substrate pane 1 by way of a light source 12 disposed behind the reverse side 7 thereof.

Alternatively, according to the first embodiment of the process as described further up, the optional step S4 can be omitted (which is why it is only shown by dotted lines in FIG. 1), and the exposure of the hologram recording layer 11 in step S5 can be conducted in a closed state of the mold in which the curved substrate pane 1 with the hologram recording layer 11 formed thereon is fixed between the two mold halves 3 and 4 that are fixed to one another according to FIG. 2c, i.e. between the further mold half 4 in which the holography master 9 is integrated and the second mold half 3 in which the substrate pane 1 has been produced and is yet to be removed. In this case, suitable exposure elements (not shown), especially optical fibers such as glass fibers and/or suitable lighting optics of a type known per se, may be integrated in the second mold half 3, these being designed for exposure of the hologram recording layer 11 with a coherent light for formation of a hologram defined by the holography master 9.

In both embodiments, with the aid of the mold, as described, it is possible in a reliable manner to ensure a hologram recording arrangement required for the present hologram recording method, in which the holography master 9, for the duration of hologram recording, is in full-area contact with the hologram recording layer 11 and a predetermined constant separation between holography master 9 and substrate surface 6 is established with a required accuracy of especially less than 10 micrometers, which corresponds to said constant layer thickness of the hologram recording layer 11.

The exposure in step S5 and any subsequent fixing with UV light result in curing of the liquid photopolymer. After the described completion of the hologram in the hologram recording layer 11, the holography master 9 is removed again therefrom in a final step S6 by removing the further mold half 4 that bears the holography master 9 from the substrate pane 1. The finished product, after the removal of both mold halves 3 and 4, comprises the curved substrate pane 1 with the hologram recording layer 11, in which the hologram is formed, formed on and bonded to the substrate surface 6.

LIST OF REFERENCE NUMERALS

1 curved substrate pane
  2 first mold half
  3 second mold half
  4 further mold half
  5 surface of the first mold half on the mold interior side that defines the predetermined curved target geometry of the substrate surface
  6 substrate surface
  7 reverse side of the curved substrate pane
  8 surface of the further mold half on the mold interior side that defines the predetermined curved target geometry of the substrate surface
  9 holography master
  10 gap
  11 hologram recording layer
  12 light source for coherent light

The invention claimed is:

1. A method of producing a curved substrate pane having a hologram, the method comprising:

producing the curved substrate pane from plastic by primary forming, injection molding or injection compression molding between a first mold half that defines a predetermined target geometry of a substrate surface and a second mold half separably fixed to the first mold half;

removing the first mold half from the second mold half in which the curved substrate pane remains, and applying a holography master in a form of a thin layer to a surface defining the target geometry in the first mold half or a further mold half;

fixing the first mold half or the further mold half having the holography master on the second mold half to leave an empty gap of a predetermined constant thickness between the holography master and the substrate surface of the curved substrate pane that has remained in the second mold half since the producing of the curved substrate pane, and filling the gap with a hologram recording material; and exposing a hologram recording layer formed thereby between the substrate surface and the holography master with a coherent light to form the hologram in the hologram recording layer, wherein the hologram is defined by the holography master.

2. The method according to claim 1, wherein the hologram is a holographic optical element.

3. The method according to claim 1, wherein the hologram recording material is a liquid photopolymer.

4. The method according to claim 1, wherein the exposing of the hologram recording layer is conducted in a closed state of the mold in which the curved substrate pane is fixed between the mold halves that are fixed to one another.

5. The method according to claim 4, wherein exposure elements are integrated in at least one of the first mold half, the second mold half, or the further mold half, wherein the exposure elements are configured to expose the hologram recording layer with the coherent light to form the hologram defined by the holography master.

6. The method according to claim 5, wherein the exposure elements comprise at least one of optical fibers or optical elements.

7. The method according to claim 1, wherein the curved substrate pane, after the hologram recording material has been introduced into the gap formed between the substrate surface and the holography master, is held or fixed in a hologram recording position with respect to the first mold half or the further mold half, while the second mold half is removed from a reverse side of the curved substrate pane, and the exposing of the hologram recording layer is conducted in the hologram recording position through the curved substrate pane by way of a light source disposed at or behind the reverse side of the curved substrate plane.

* * * * *